(12) United States Patent
Miyata

(10) Patent No.: US 9,373,311 B2
(45) Date of Patent: Jun. 21, 2016

(54) METHOD OF MANUFACTURING ELECTRONIC PERCUSSION PAD

(71) Applicant: Yamaha Corporation, Hamamatsu-Shi, Shizuoka-Ken (JP)

(72) Inventor: Tomoya Miyata, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 14/459,704

(22) Filed: Aug. 14, 2014

(65) Prior Publication Data

US 2015/0053068 A1 Feb. 26, 2015

(30) Foreign Application Priority Data

Aug. 20, 2013 (JP) ................. 2013-170461

(51) Int. Cl.
| | |
|---|---|
| G10D 13/02 | (2006.01) |
| G10H 3/00 | (2006.01) |
| B29C 44/12 | (2006.01) |
| B29C 70/78 | (2006.01) |
| B29C 70/22 | (2006.01) |
| B29L 31/34 | (2006.01) |
| B29K 105/04 | (2006.01) |
| B29K 75/00 | (2006.01) |
| B29L 31/00 | (2006.01) |
| B29K 705/02 | (2006.01) |

(52) U.S. Cl.
CPC .......... *G10D 13/029* (2013.01); *B29C 44/1209* (2013.01); *B29C 70/22* (2013.01); *B29C 70/78* (2013.01); *G10D 13/02* (2013.01); *G10H 3/00* (2013.01); *B29K 2075/00* (2013.01); *B29K 2105/04* (2013.01); *B29K 2705/02* (2013.01); *B29K 2713/00* (2013.01); *B29L 2031/34* (2013.01); *B29L 2031/758* (2013.01)

(58) Field of Classification Search
CPC .. G10D 13/02; G10D 13/029; B29C 44/1209; B29C 70/78; G10H 3/00
USPC ..................................... 84/723, 414
See application file for complete search history.

(56) References Cited

U.S. PATENT DOCUMENTS

| | | | | |
|---|---|---|---|---|
| 3,025,202 A | * | 3/1962 | Morgan | .................. D04H 1/68 156/43 |
| 3,161,919 A | * | 12/1964 | Renaud | ............... B29C 33/3807 204/290.05 |
| 3,634,184 A | * | 1/1972 | Wang | ..................... B32B 27/00 428/297.4 |
| 3,989,781 A | * | 11/1976 | Chant | ................. B29C 44/5618 264/257 |

(Continued)

FOREIGN PATENT DOCUMENTS

| | | |
|---|---|---|
| JP | A-04-053837 | 2/1992 |
| JP | 2003-295864 A | 10/2003 |

(Continued)

OTHER PUBLICATIONS

Office Action issued Jan. 19, 2016 in Japanese Patent Application No. 2013-170461.

*Primary Examiner* — David Warren
*Assistant Examiner* — Christina Schreiber
(74) *Attorney, Agent, or Firm* — Blank Rome LLP

(57) ABSTRACT

An electronic percussion pad includes: a pad main body that is formed of a foaming elastomer; and a composite layer that includes an expandable fiber sheet laminated on a front surface of the pad main body. In the composite layer, fiber of the fiber sheet and a foaming elastomer of the pad main body are present, and the composite layer contains bubbles.

8 Claims, 3 Drawing Sheets

(56) References Cited

U.S. PATENT DOCUMENTS

| | | | | |
|---|---|---|---|---|
| 4,581,972 A * | 4/1986 | Hoshino | G10D 13/024 | 84/411 P |
| 4,581,973 A * | 4/1986 | Hoshino | G10D 13/024 | 84/411 P |
| 5,112,663 A * | 5/1992 | Morenz | B29C 44/1209 | 156/213 |
| 5,879,793 A * | 3/1999 | Kummermehr | A01G 31/001 | 428/306.6 |
| 7,429,698 B2 * | 9/2008 | Pickens | G10H 3/12 | 84/411 R |
| 7,816,597 B2 * | 10/2010 | Okada | G10D 13/024 | 84/411 R |
| 8,148,617 B2 * | 4/2012 | Hashimoto | G10D 13/029 | 84/411 P |
| 8,933,310 B2 * | 1/2015 | Rogers | G10D 13/02 | 84/104 |
| 2005/0109190 A1 * | 5/2005 | Smith | B32B 5/18 | 84/414 |
| 2005/0211062 A1 * | 9/2005 | Hiraku | G10D 13/024 | 84/414 |
| 2007/0184238 A1 * | 8/2007 | Hockaday | B32B 7/00 | 428/98 |
| 2009/0241754 A1 * | 10/2009 | Okada | G10D 13/029 | 84/414 |
| 2010/0282048 A1 * | 11/2010 | Hashimoto | G10D 13/029 | 84/743 |
| 2012/0180621 A1 * | 7/2012 | Holl | G10D 13/027 | 84/723 |

FOREIGN PATENT DOCUMENTS

| | | |
|---|---|---|
| JP | A-2008-181165 | 8/2008 |
| JP | A-2008-254306 | 10/2008 |
| JP | A-2009-229514 | 10/2009 |
| JP | A-2009-244462 | 10/2009 |
| JP | 2010-262167 A | 11/2010 |

* cited by examiner of the present invention relates to an electronic percussion pad and a method of manufacturing an electronic percussion pad.

METHOD OF MANUFACTURING ELECTRONIC PERCUSSION PAD

BACKGROUND OF THE INVENTION

1. Field of the Invention

The present invention relates to an electronic percussion pad and a method of manufacturing an electronic percussion pad.

Priority is claimed on Japanese Patent Application No. 2013-170461, filed on Aug. 20, 2013, the content of which is incorporated herein by reference.

2. Description of Related Art

As an electronic percussion pad, a drum pad used as an electronic percussion, which detects a strike on a striking surface with a sensor and generates an electronic sound close to a sound of a natural percussion instrument, is known. As such a drum pad, one in which an elastic fiber sheet is laminated on a front surface of a pad main body formed of an elastomer to obtain a desired striking feel and reduce a striking sound is known (for example, refer to Japanese Unexamined Patent Application. First Publication No. 2010-262167).

In such a drum pad, a pad main body having a front surface on which a fiber sheet is bonded is obtained with a method including: disposing a fiber sheet in molding dies; supplying an elastomer composition (pad main body-forming material) to the molding dies; and curing the elastomer composition.

However, the elastomer composition which is the pad main body-forming material is cured in a state of being impregnated into the fiber sheet in a surface layer portion of the pad main body. Therefore, the elasticity of the fiber sheet is hindered by an elastomer present in the fiber sheet, and the surface layer of the drum pad may be hardened. In addition, the fiber sheet disposed in the molding dies is compressed in a thickness direction thereof by a molding pressure during the molding of the pad main body, and thus the thickness thereof is reduced. As a result, the surface layer of the drum pad may be hardened.

In this way, when the surface layer of the drum pad is hardened, a desired striking feel cannot be obtained, and a striking sound increases.

Japanese Unexamined Patent Application, First Publication No. 2010-262167 discloses that a foaming silicone composition is used as the pad main body-forming material. However, when the pad main body is formed of the foaming silicone composition, the foaming silicone composition foams in a portion where the fiber sheet is not present, but the foaming silicone composition impregnated into the fiber sheet does not foam sufficiently. As a result, the surface layer of the drum pad is hardened.

SUMMARY OF THE INVENTION

The present invention has been made in consideration of the above-described circumstances, and an object thereof is to provide an electronic percussion pad and the method of manufacturing the same, in which a desired striking feel can be obtained and a striking sound is small.

According to an aspect of the present invention which was made in order to solve the above-described problems, there is provided an electronic percussion pad comprising: a pad main body that is formed of a foaming elastomer; and a composite layer that is laminated on a front surface of the pad main body, the composite layer including fiber of an expandable fiber sheet, a foaming elastomer which forms the pad main body, and bubbles.

In this electronic percussion pad, the composite layer in which the fiber and the foaming elastomer are present contains bubbles and thus is superior in elasticity. As a result, since a surface layer of the electronic percussion pad has a desired flexibility, a desired striking feel can be obtained and a striking sound is small.

According to another aspect of the invention, there is provided a method of manufacturing an electronic percussion pad, the method including the steps of: impregnating a foaming elastomer composition into an expandable fiber sheet; and allowing the foaming elastomer composition to foam and be cured to form bubbles in a composite layer in which the fiber sheet is included.

According to this method of manufacturing an electronic percussion pad, the electronic percussion pad in which the composite layer, where the fiber of the fiber sheet and the foaming elastomer are present, contains bubbles can be easily and reliably manufactured. In this electronic percussion pad manufactured as above, a desired striking feel can be obtained and a striking sound is small as described above.

As described above, in the electronic percussion pad according to the present invention, a desired striking feel can be obtained and a striking sound is small.

DETAILED DESCRIPTION OF THE INVENTION

Hereinafter, an embodiment of the present invention will be described with reference to the accompanying drawings. As an electronic percussion pad according to an embodiment of the present invention, an electronic drum is used, and a drum pad 1 which is struck by a stick or the like will be described. The electronic percussion pad according to the present invention is not limited to the drum pad 1 and can be applied to other percussion input devices.

[Drum Pad]

Figure 1:
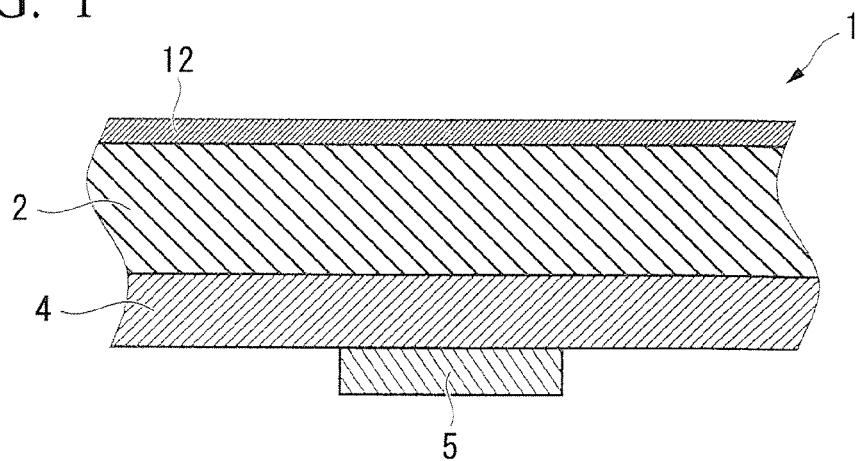
FIG. 1 is a cross-sectional view showing a drum pad according to an embodiment of the present invention.

The drum pad 1 of FIG. 1 includes a pad main body 2 that is formed of a foaming elastomer, a composite layer 12 that is laminated on a front surface of the pad main body 2, a support body 4 that supports the pad main body 2 from a back surface thereof, and a sensor 5 that detects a strike. The composite layer 12 is a layer in which the foaming elastomer of the pad main body 2 is impregnated into an expandable fiber sheet. "Front surfaces" of the pad main body 2, the support body 4, and the composite layer 12 refer to upper surfaces in FIG. 1, and "back surfaces" thereof refers to lower surfaces in FIG. 1.

This drum pad 1 is assumed to be used in, for example, 10-inch to 14-inch long snare and tom-tom drums of an electronic drum kit and specifically has, for example, a diameter of 200 mm to 300 mm and a thickness of 10 mm to 30 mm. In addition, the drum pad 1 may include a cylindrical shell (drum barrel (not shown)) that surrounds a periphery of the pad main body 2, and this shell may include a rim at a front-side end portion thereof. The size, the use, and the like of the drum pad 1 are not limited to those described above.

Figure 2:
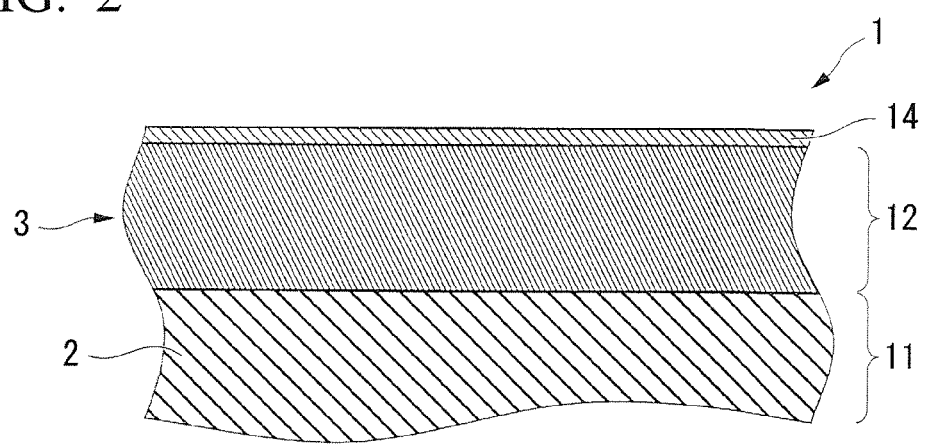
FIG. 2 is a cross-sectional view showing a layer structure of the drum pad of FIG. 1.

Referring to FIG. 2, the drum pad 1 has a multi-layer structure in which a foaming elastomer layer 11, the composite layer 12, and a resin coating layer 14 are laminated on the front surface of the support body 4. The foaming elastomer layer 11 forms the pad main body 2 and is formed of only the foaming elastomer. The composite layer 12 is disposed on the front surface of the foaming elastomer layer 11, and the foaming elastomer of the pad main body 2 and the fiber of the fiber sheet 3 are present therein. This composite layer 12 contains bubbles. The resin coating layer 14 is a resin layer that is laminated on the front surface of the composite layer 12.

(Fiber Sheet)

The fiber sheet 3 is an expandable fiber sheet. The fiber sheet 3 is not particularly limited as long as it is an expandable sheet, and a well-known fiber sheet may be used. It is preferable that the fiber sheet 3 be expandable, that is, have a restoring force when being expanded. It is preferable that the fiber sheet 3 be expandable (two-way stretch) in any sheet plane direction (any two-dimensional direction). As the fiber sheet 3, a knitted material (knitted fabric) is preferably adopted.

The fiber included in the fiber sheet 3 is not particularly limited as long as the foaming elastomer composition can be impregnated into it. Natural fiber may also be adopted, but synthetic fiber is preferably used from the viewpoint of the strength of the fiber sheet 3 and the like. Examples of the synthetic resin include fibers formed of polyolefin resins such as polyethylene resins and polypropylene resins; fibers formed of polyamide resins such as polyester resins, polyacrylic resins, and nylons; and synthetic resins formed of copolymers, modified products, and combinations of the above-described resins. These fibers may be used alone or in a combination of a plurality of kinds of fibers.

Further, when the knitted material is used as the fiber sheet 3 as described above, the lower limit of the fineness of the fiber is preferably 140 dtex and more preferably 150 dtex. On the other hand, the upper limit of the fineness of the fiber is preferably 200 dtex and more preferably 190 dtex.

When the fineness of the fiber is less than the lower limit, the strength of the fiber sheet 3 may be insufficient. Conversely, when the fineness of the fiber is more than the upper limit, the fiber sheet 3 is excessively thick, which may impair a striking feel.

In addition, the lower limit of the gauge of the knitted material is preferably 50 G and more preferably 55 G. On the other hand, the upper limit of the gauge of the knitted material is preferably 70 G and more preferably 65 G.

When the gauge of the knitted material is less than the lower limit, the strength of the fiber sheet 3 may be insufficient. Conversely, when the gauge of the knitted material is more than the upper limit, the cost of the fiber sheet 3 increases, which may lead to an increase in the cost of the drum pad 1.

By controlling the gauge of the knitted material to be in the above-described range and controlling the fineness of the fiber to be in the above-described range, the fiber sheet 3 can easily and reliably form bubbles in the composite layer 12 due to the foaming of the foaming elastomer composition as described below.

In this way, the fiber sheet is preferably the knitted material, the fineness of the fiber of the knitted material is preferably 140 dtex to 200 dtex, and the gauge of the knitted material is preferably 50 G to 70 G. When the fiber sheet is the knitted material having the above-described numerical ranges, the fiber sheet is superior in elasticity and strength, and thus the composite layer 12 can obtain sufficient elasticity and strength.

The lower limit of the average thickness of the fiber sheet 3 is preferably 250 µm and more preferably 400 µm. On the other hand, the upper limit of the average thickness of the fiber sheet 3 is preferably 800 µm and more preferably 600 µm.

When the average thickness of the fiber sheet 3 is less than the lower limit, the strength of the fiber sheet 3 may be insufficient. Conversely, when the average thickness of the fiber sheet 3 is more than the upper limit, the fiber sheet 3 is excessively thick, which may impair a striking feel.

(Pad Main Body)

As the foaming elastomer which forms the pad main body 2, in the embodiment, foaming polyurethane is used. As a composition of this foaming polyurethane, a well-known material is used. Specifically, for example, a composition containing polyol, isocyanate, and a foaming agent is used. This foaming polyurethane composition may optionally contain various additives such as a curing agent, a colorant, a light stabilizer, a thermal stabilizer, an antioxidant, an anti-fungal agent, and a flame retardant within a range in which the properties of the pad main body 2 do not deteriorate.

The polyol is not particularly limited as long as it can form a urethane bond with isocyanate. As the polyol, for example, polyether polyol, polyester polyol, polycarbonate polyol, or polycaprolactone polyol may be used.

The number average molecular weight of the polyol is preferably from 200 to 10000. When the number average molecular weight is less than the lower limit, the reaction rapidly progresses, and desirable molding is difficult to be performed. In addition, the flexibility of the pad main body 2 may be insufficient. On the other hand, when the number average molecular weight is more than the upper limit, the viscosity of the foaming polyurethane composition is excessively high, and molding is difficult to be performed.

The isocyanate is not particularly limited as long as it can form a urethane bond with polyol. As this isocyanate, for example, tolylene diisocyanate, diphenyl methane diisocyanate, or hexamethylene diisocyanate may be used.

The foaming agent is not particularly limited as long as it can foam during the molding of the pad main body 2. As the foaming agent, for example, a thermally decomposable foaming agent that foams by heat may be used. As this thermally decomposable foaming agent, for example, a hydrazine-based foaming agent such as oxy-bis-benzene-sulfonyl hydrazide (OBSH) or p-toluenesulfonyl hydrazide; and an azo-based foaming agent such as azodicarbonamide (ADCA) or azobisformamide may be used. The decomposition temperature of the thermally decomposable foaming agent is preferably 100° C. to 240° C. in consideration of the easiness of the molding of the pad main body 2.

As described above, the foaming polyurethane is preferably used as the foaming elastomer of the pad main body 2. As a result, the composite layer which contains bubbles as described above and is superior in the bondability between the fiber sheet and the pad main body can be easily and reliably formed.

(Support Body)

The support body 4 is formed of a planar disk in the embodiment. As a material of the support body 4, for example, a metal plate such as an iron plate, a steel sheet, a galvanized steel sheet, or an aluminum plate may be used. However, the material of the support body 4 is not particularly limited. In addition, the average thickness of the support body 4 is, for example, 0.5 mm to 3 mm but is not particularly limited.

On the front surface of the support body 4, the pad main body 2 is directly laminated. That is, in the embodiment, the support body 4 and the pad main body 2 are bonded to each other by a foam pressure of the foaming polyurethane included in the pad main body 2. Specifically, the pad main body 2 and the support body 4 are bonded to each other by allowing the foaming polyurethane composition (pad main body-forming material) to foam and be cured on the front surface of the support body 4.

The lower limit of the peel strength of the pad main body 2 and the support body 4 is preferably 5 N/25 mm and more preferably 7 N/25 mm. When the peel strength is less than the lower limit, the bonding state between the pad main body 2 and the support body 4 is insufficient, and thus the pad main body 2 and the support body 4 may be peeled from each other. The peel strength is a value measured according to JIS K 6854-1.

(Sensor)

As shown in FIG. 1, the sensor 5 is attached to the back surface of the support body 4. This sensor 5 is bonded to the back surface of the support body 4 through an adhesive (not illustrated). A vibration absorbing material may be appropriately interposed between the sensor 5 and the back surface of the support body 4. In addition, an installation position of the sensor 5 is not particularly limited, but it is preferable that the sensor 5 be attached to substantially the center of the support body 4. As the adhesive, for example, a reactive adhesive may be used. However, the adhesive is not particularly limited as long as it can bond to the sensor 5.

This sensor 5 detects a strike on the pad main body 2, on which the composite layer 12 is provided, and outputs a strike detection signal from a signal output line (not illustrated) to an electronic sound source (not illustrated). As the sensor 5, for example, a piezoelectric element or a sound collecting microphone may be used. However, the sensor 5 is not particularly limited as long as it can detect a strike.

(Description of Layer Structure)

The resin coating layer 14 is not particularly limited as long as it is a layer that coats the front surface of the fiber sheet 3 included in the composite layer 12. For example, the resin coating layer 14 can be formed by thermally fusing a thermally fusible and elastic film to be bonded to the front surface of the fiber sheet 3.

As a resin of the resin coating layer 14, for example, polyolefin resins such as polyethylene resins and polypropylene resins, polyurethane resins, polyester resins, or copolymers of the above-described resins may be used. The average thickness of the resin coating layer 14 is, for example, 10 μm to 80 μm but is not limited thereto.

The resin coating layer 14 may be formed of a composite layer including: a resin which is a coating material; and the fiber of the fiber sheet 3. In addition, the resin coating layer 14 may have a two-layer structure including: a resin layer of a coating material; and the composite layer that is positioned on the back surface of the resin layer.

The lower limit of the surface hardness (Asker C hardness) of the resin coating layer 14 is preferably 10 and more preferably 30. On the other hand, the upper limit of the surface hardness is preferably 60 and more preferably 50.

When the surface hardness of the resin coating layer 14 is less than the lower limit, the surface layer of the drum pad 1 is excessively flexible, and a desirable striking feel may not be obtained. Conversely, when the surface hardness is more than the upper limit, the surface layer of the drum pad 1 is excessively hard, and a desirable striking feel may not be obtained. This surface hardness is a value measured according to Asker C hardness of JIS K 7312.

In this way, it is preferable that the electronic percussion pad further include the resin coating layer 14 that is laminated on the front surface of the fiber sheet 3 of the composite layer 12 and is disposed on the front surface of the composite layer 12. By providing the resin coating layer 14 on the front surface of the composite layer 12, deterioration of the composite layer 12 by a strike or the like can be reduced, and thus bubbles contained in the composite layer 12 are not discharged from the front surface.

The composite layer 12 is a layer in which the foaming elastomer of the pad main body 2 and the fiber and the fiber sheet 3 are mixed as described above, and the pad main body 2 and the fiber sheet 3 are strongly bonded to each other through the composite layer 12. This composite layer 12 is formed by the foaming elastomer composition being impregnated into a part (back surface) of the fiber sheet 3 and being cured.

The lower limit of the expansion ratio of the composite layer 12 and the foaming elastomer layer 11 is preferably 1.2 times and more preferably 1.5 times. The expansion ratio refers to a value obtained by dividing the volume of the foaming elastomer composition after foaming, which is obtained on the assumption that the liquid foaming elastomer composition foams under atmospheric pressure, by the total volume of the composite layer and the foaming elastomer layer which are actually molded. On the other hand, the upper limit of the expansion ratio is preferably 5.5 times and more preferably 2.5 times.

When the expansion ratio is less than the lower limit, the foam pressure is excessively low, and thus the bond strength between the foaming elastomer layer 11 and the support body 4 may be weakened. Conversely, when the expansion ratio is more than the upper limit, the internal pressure of the molding dies is excessively high, the molding dies cannot endure the pressure, and the composite layer 12 and the foaming elastomer layer 11 cannot be molded. In addition, high cost is required to manufacture molding dies that can endure the pressure.

The porosity (ratio of pores where the elastomer and the fiber are not present) of the composite layer 12 is preferably 30% and more preferably 40%. On the other hand, the upper limit of the porosity is preferably 80% and more preferably 70%.

When the porosity is less than the lower limit, the composite layer 12 is excessively hard, and a desirable striking feel may not be obtained in the drum pad 1. Conversely, when the porosity is more than the upper limit, the composite layer 12 is excessively flexible, and the strength thereof may be insufficient for a strike. In addition, it is preferable that the porosity of the foaming elastomer layer substantially the same as the porosity of the composite layer 12. Specifically, the porosity of the foaming elastomer layer is 1 to 1.2 times the porosity of the composite layer 12.

In this way, the porosity of the composite layer 12 is preferably 30% to 80%. By setting the porosity as described above, the composite layer can obtain sufficient elasticity and strength. This porosity can be measured from an apparent density calculated according to "Cellular Plastics and Rubbers-Determination of Apparent (bulk) Density" of JIS K 7222.

The average value of cross-sectional areas of the bubbles of the composite layer 12 is preferably 2,500 $\mu m^2$ to 40,000 $\mu m^2$.

When the average value of the cross-sectional areas is less than the lower limit, the effect of improving the elasticity of the composite layer 12 by the presence of the bubbles may be insufficient. Conversely, when the average value of the cross-sectional areas is more than the upper limit, the bonding between the pad main body 2 and the fiber sheet 3 may be insufficient. The average value of the cross-sectional areas can be obtained by cutting the bubbles in the thickness direction thereof to obtain cross-sections and dividing the total cross-sectional area of the bubbles by the number of the bubbles.

As described above, the foaming elastomer layer 11 is a layer which forms the pad main body 2, and the back surface of the foaming elastomer layer 11 is bonded to the front surface of the support body 4 by the foam pressure. The thickness of the foaming elastomer layer 11 is not particularly limited, and the average thickness of the foaming elastomer layer 11 is, for example, 5 mm to 20 mm.

[Method of Manufacturing Drum Pad]

Next, a method of manufacturing the drum pad 1 will be described.

The method of manufacturing the drum pad 1 includes:

a process (resin coating layer forming process) of forming the resin coating layer 14 on the front surface of an expandable fiber sheet 3;

a process (foaming elastomer composition supply process) of impregnating the foaming elastomer composition into the fiber sheet 3;

a process (foaming and curing process) of allowing the foaming elastomer composition to foam and be cured to form bubbles in a layer in which the fiber sheet 3 and the foaming elastomer composition are mixed; and a process (sensor attaching process) of attaching the sensor 5 to the back surface of the support body 4.

In the resin coating layer forming process, the resin coating layer 14 is formed by thermally fusing a thermally fusible and elastic film to be bonded to the front surface of the fiber sheet 3. In the resin coating layer forming process, a method can be adopted, the method including: coating the front surface of the resin sheet 3 with a resin coating layer-forming material; and drying the resin coating layer-forming material.

Figure 3:
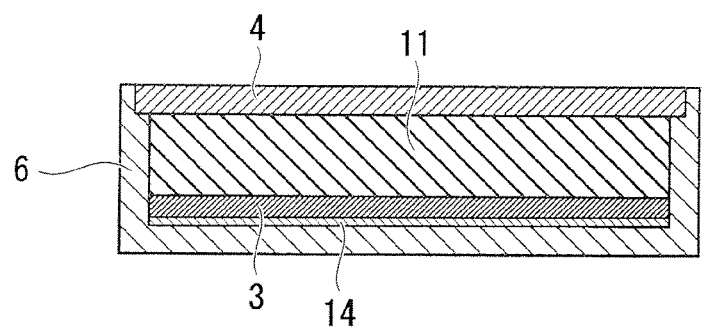
FIG. 3 is a cross-sectional view showing a process of a method of manufacturing the drum pad of FIG. 1.

In the foaming elastomer composition supply process, first, as shown in FIG. 3, the liquid elastomer composition is supplied to the molding dies 6 for molding the pad main body in a state where the fiber sheet 3 is disposed on the bottom surface of the molding dies 6 such that the resin coating layer 12 faces downward. Next, the support body 4 is fixed so as to close an upper opening of the molding dies 6. In this foaming elastomer composition supply process, the elastomer composition is impregnated into a region ranging from the back surface of the fiber sheet 3 to the back surface of the resin coating layer 14.

In an illustrated example, the fiber sheet 3 is disposed to be positioned on the bottom surface of the molding dies 6 such that the support body 4 functions as a cover of the molding dies 6. However, the support body 4 may functions as the bottom surface of the molding dies 6, and the fiber sheet 3 may be disposed to be positioned on the top surface of the molding dies 6.

In the foaming and curing process, the foaming elastomer composition supplied from the molding dies 6 as described above is allowed to foam and be cured. As a result, the pad main body 2 is formed and the composite layer 12 having bubbles is formed as described above. In addition, in the foaming and curing process, the support body 4 and the pad main body 2 are bonded to each other by a foam pressure of the foaming elastomer composition. Specifically, the foaming elastomer composition foams by, for example, being heated and is cured by polymerization of polyol and isocyanate. As a result, the pad main body 2 is molded and is bonded to the support body 4.

This foam pressure (internal pressure of the molding dies 6 in the foaming and curing process) is preferably 1.2 kgf/cm$^2$ to 5.5 kgf/cm$^2$.

When the foam pressure is less than the lower limit, the sufficient bonding between the pad main body 2 and the support body 4 may not be obtained. Conversely, when the foam pressure is more than the upper limit, high cost is required to manufacture the molding dies 6 that can endure the pressure, which may lead to an increase in manufacturing cost.

In the sensor attaching process, the sensor 5 is attached by bonding to the center of the support body 4. The sensor attaching process may be performed after the foaming and curing process or before the foaming elastomer composition supply process.

Advantageous Effects

In the drum pad 1, the composite layer 12 in which the fiber of the fiber sheet 3 and the foaming elastomer of the pad main body 2 are present (mixed) contains bubbles. Due to these bubbles, the composite layer 12 is superior in elasticity, and the surface layer of the drum pad 1 has a desired flexibility. Therefore, in the drum pad 1, a desired striking feel can be obtained, and a strike sound is small when the drum pad 1 is struck.

Further, in the drum pad 1, during the molding of the pad main body 2, the fiber sheet 3 disposed in the molding dies 6 is compressed in a thickness direction thereof by a molding pressure. However, the bubbles are formed in the composite layer 12 by allowing the foaming elastomer composition, which is impregnated into the fiber sheet 3, to foam. Therefore, the surface layer of the drum pad 1 has a desired flexibility as described above.

In addition, the drum pad 1 includes the resin coating layer 14. Therefore, deterioration of the composite layer 12 by a strike or the like can be reduced, and thus bubbles contained in the composite layer 12 are not discharged from the front surface. Further, when the composite layer 12 is formed, the resin coating layer 14 inhibits the bubbles formed in the fiber sheet 3 from being discharged from the front surface of the composite layer 12. Accordingly, desirable bubbles can be formed in the composite layer 12 easily and reliably.

In addition, the pad main body 2 is directly bonded to the support body 4 by the foam pressure of the foaming elastomer composition. Therefore, it is not necessary to provide an adhesive layer between the pad main body 2 and the support body 4, and thus the manufacturing cost can be reduced. Further, since the drum pad 1 does not include an adhesive layer between pad main body 2 and the support body 4, the detection time of the sensor 5 is not delayed by the adhesive layer, and the sensitivity of the sensor 5 is satisfactory.

[Other Embodiments]

The embodiment has the above-described configurations and exhibits the above-described advantageous effects. However, the present invention is not limited to this embodiment. Various design modifications can be appropriately made within the scope of the present invention.

That is, in the description of the embodiment, the pad main body is formed of the foaming polyurethane. However, the pad main body may also be formed of foaming silicone rubber or the like. As the foaming silicone rubber, for example, foaming silicone rubber having a siloxane bond such as foaming RTV silicone rubber may be used.

In addition, in the present invention, the support body is not an essential component. Further, even when the electronic percussion pad includes a support body, it is not necessary that the pad main body and the support body be bonded to each other by a foam pressure of the foaming elastomer. That is, an adhesive layer may be interposed between the pad main body and the support body to bond the pad main body and the support body to each other. As an adhesive forming the adhesive layer, for example, an acrylic adhesive may be used.

In the electronic percussion pad, a fabric material such as non-woven fabric may be disposed on the back surface of the foaming elastomer layer. When a fabric material is disposed on the back surface of the foaming elastomer layer, it is preferable that an adhesive layer be interposed between the fabric material and the support body. As an adhesive forming the adhesive layer, for example, an acrylic adhesive may be used.

In addition, in the description of the embodiment, the drum pad includes the resin coating layer. However, in the present invention, the resin coating layer is not an essential component.

Further, in the description of the embodiment, the resin coating layer and the composite layer are bonded to each other by impregnating the foaming elastomer composition into the back surface of the resin coating layer. However, the present invention is not limited to this embodiment. That is, a fiber layer in which the foaming elastomer (and the fiber of the resin coating layer) is not present and only the fiber of the fiber sheet is present may be provided on a surface above the composite layer including the fiber and the foaming elastomer (between the composite layer and the resin coating layer), by allowing the foaming elastomer composition to foam and be cured before the foaming elastomer composition is completely impregnated into the fiber sheet (before being impregnated into the back surface of the resin coating layer). This configuration is also included in the scope of the present invention. Even when the fiber layer is provided in this way, the resin coating layer may not be provided.

EXAMPLE 1

First, a polyurethane film was laminated on a fiber sheet obtained by knitting polyester fiber having a fineness of 160 dtex at 60 G. As a result, a fiber sheet having a front surface on which a resin coating layer having an average thickness of 20 μm was formed was prepared. The average thickness of this fiber sheet was 400 μm.

In a state where the fiber sheet was disposed on the bottom surface of molding dies, a liquid foaming elastomer composition was supplied thereto, and a support body is disposed to function as a cover of the molding dies. As a result, the molding dies are closed.

As this foaming elastomer composition, a composition containing 25 parts by mass of an isocyanate component, 0.5 parts by mass of a foaming agent, 1 part by mass of a foam stabilizer, 0.2 parts by mass of a catalyst for accelerating the curing of the foaming elastomer composition, and 0.3 parts by mass of a catalyst for accelerating the foaming of the foaming elastomer composition with respect to 100 parts by mass of a polyol component was used.

As the polyol component, PTMG 2000 (manufactured by Mitsubishi Chemical Corporation) was used.

As the isocyanate component, carbodiimide modified MDI (manufactured by BASF INOAC Polyurethanes Ltd.) was used.

As the foaming agent, water was used. As the foam stabilizer, a silicon-based foam stabilizer was used.

As the catalyst for accelerating the curing of the foaming elastomer composition, triethylenediamine was used. As the catalyst for accelerating the foaming of the foaming elastomer composition, pentamethyldiethylenetriamine was used.

As the support body, a galvanized steel sheet having a thickness of 0.8 mm was used. The molding dies were provided such that the average thickness of the molded pad main body was 15 mm.

In the molding dies closed as described above, a pad main body-forming material was allowed to foam and be cured at a temperature of 55° C. for 30 minutes.

The foaming elastomer composition was put into the molding dies such that it free-foamed in an amount approximately 1.5 times to 2 times the volume of the molding dies. Specifically, 250 cc of the elastomer composition was put into the molding dies having a volume of 615 cc. When the elastomer composition free-foams, the volume expands to 4 times, that is, 1000 cc. However, since the elastomer composition was allowed to foam and be cured in the molding dies as described above, the volume did not expand to more than 615 cc. Therefore, the expansion ratio of the pad main body was 1000 cc/615 cc, that is, 1.62 times. This expansion ratio can be adjusted by adjusting the amount of water as the foaming agent. For example, the expansion ratio can be adjusted to 6 times by adjusting the amount of water. As described above, the foaming polyurethane composition did not expand to more than 615 cc, but the non-expanding volume contributed to a foam pressure. This foam pressure was 1.2 kgf/cm$^2$ to 5.5 kgf/cm$^2$. The porosity of the pad main body was 0.60, and the Asker C hardness of the pad main body was 40.

Figure 4:
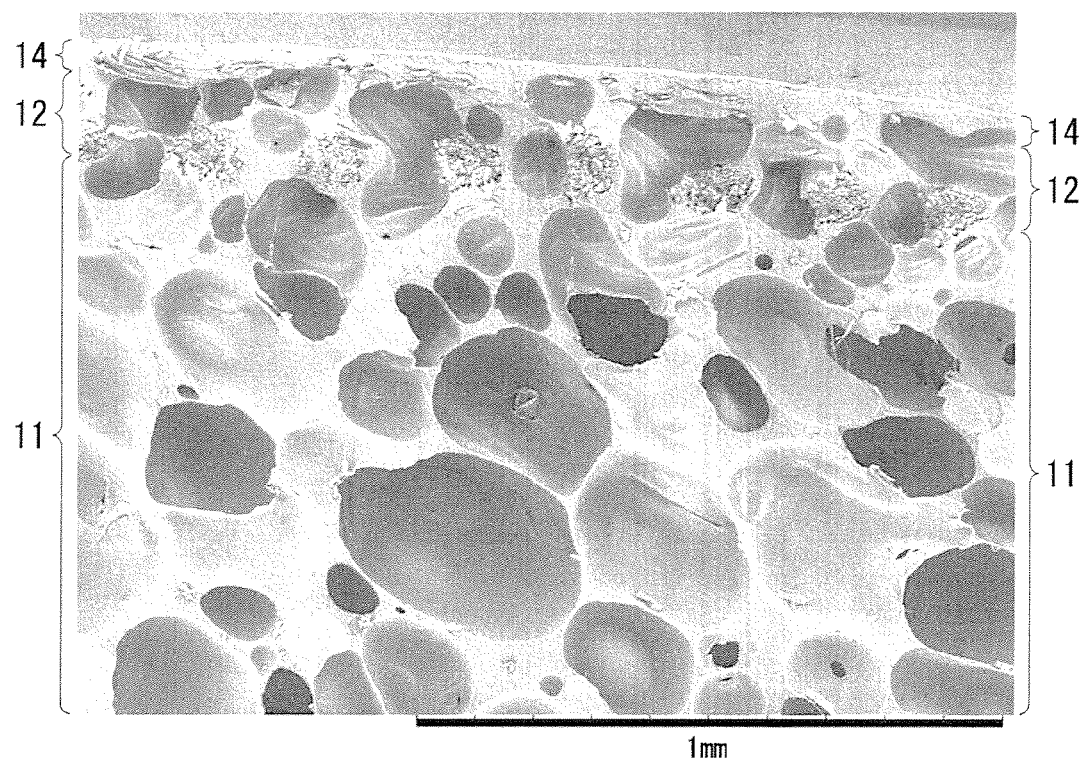
FIG. 4 is an image showing a cross-section of a drum pad of Example 1.

In the drum pad of Example 1, as described above, the pad main body was molded by allowing the foaming elastomer composition to foam and be cured. By allowing the liquid foaming elastomer composition to foam after being impregnated into the fiber sheet, as illustrated in FIG. 4, bubbles were present in the composite layer 12 (layer including the fiber and the elastomer) formed by curing.

COMPARATIVE EXAMPLE 1

Figure 5:
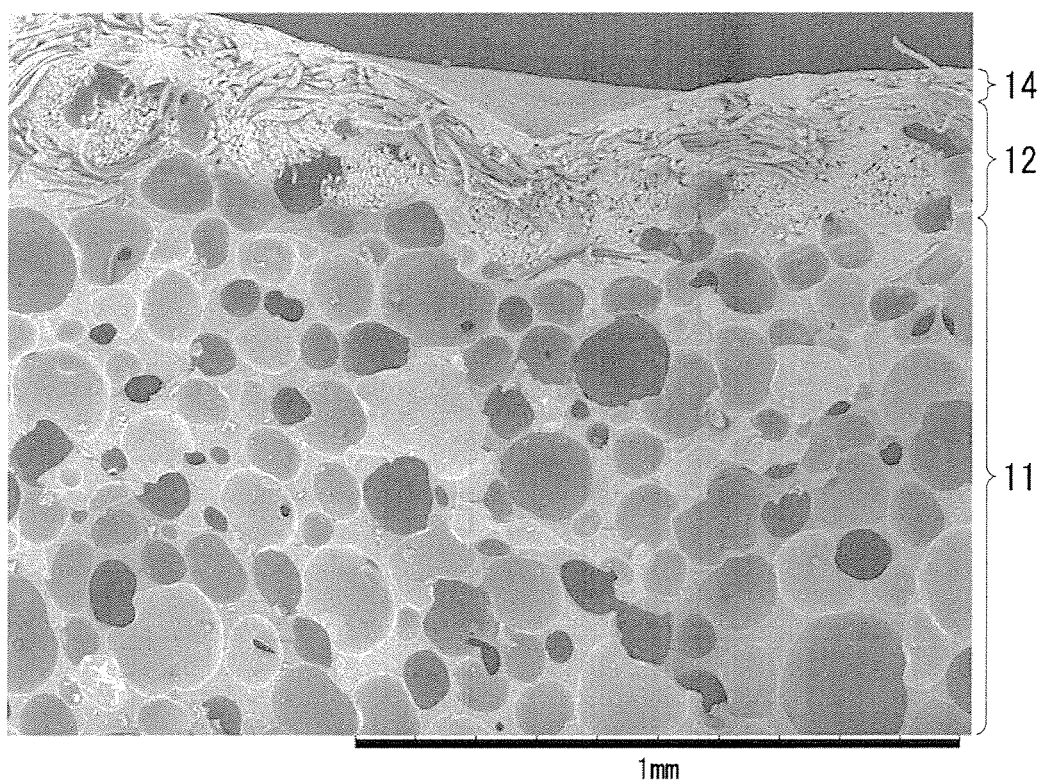
FIG. 5 is an image showing a cross-section of a drum pad of Comparative Example 1.

In Comparative Example 1, a foaming elastomer composition containing 25 parts by mass of the isocyanate component, 0.5 parts by mass of the foaming agent, 1 part by mass of the foam stabilizer, and 0.5 parts by mass of the catalyst for accelerating the curing of the foaming elastomer composition with respect to 100 parts by mass of the polyol component was used. That is, in Comparative Example 1, the foaming elastomer composition not containing the catalyst for accelerating the foaming of the foaming elastomer composition was used. A drum pad of Comparative Example 1 was obtained with the same method as that of Example 1, except that the above-described foaming elastomer composition was used. In the composite layer of the drum pad of Comparative Example 1 obtained as above, bubbles were not present as shown in FIG. 5.

<Striking Feel Test>

In the drum pad of Example 1, a desired striking feel was obtained compared to the drum pad of Comparative Example 1. Specifically, in the drum pad of Example 1, a soft striking feel was obtained; however, in the drum pad of Comparative Example 1, a soft striking feel was not able to be obtained. In addition, in the drum pad of Example 1, a striking sound is smaller than that of the drum pad of Comparative Example 1.

As described above, in the electronic percussion pad according to the present invention, a desired striking feel can be obtained and a striking sound is small. Therefore, the electronic percussion pad can be desirably used in electronic musical instruments such as electronic drums.

While preferred embodiments of the invention have been described and shown above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electronic percussion pad comprising:
a pad main body that is formed of a foaming elastomer, and
a composite layer that is laminated on a front surface of the pad main body, the composite layer being a layer in which the foaming elastomer of the pad main body is impregnated into an expandable fiber sheet; wherein bubbles are formed in the composite layer by allowing the foaming elastomer impregnated into the expandable fiber sheet to foam; wherein the average value;
of cross-sectional area of the bubbles is 2,500 μm² to 40,000 μm².

2. The electronic percussion pad according to claim 1, wherein the foaming elastomer is foaming polyurethane.

3. The electronic percussion pad according to claim 2, wherein a porosity of the composite layer is 30% to 80%.

4. The electronic percussion pad according to claim 2, further comprising a resin coating layer that is disposed on a front surface of the fiber sheet or the composite layer.

5. The electronic percussion pad according to claim 2, wherein the fiber sheet is a knitted material, a fineness of fiber of the knitted material is 140 dtex to 200 dtex, and a gauge of the knitted material is 50 G to 70 G.

6. The electronic percussion pad according to claim 1, wherein a porosity of the composite layer is 30% to 80%.

7. The electronic percussion pad according to claim 1, further comprising a resin coating layer that is disposed on a front surface of the fiber sheet or the composite layer.

8. The electronic percussion pad according to claim 1, wherein the fiber sheet is a knitted material, a fineness of fiber of the knitted material is 140 dtex to 200 dtex, and a gauge of the knitted material is 50 G to 70 G.

* * * * *